United States Patent
Kobayashi

(10) Patent No.: US 10,914,279 B2
(45) Date of Patent: Feb. 9, 2021

(54) IGNITION TIMING CONTROLLER OF INTERNAL COMBUSTION ENGINE

(71) Applicant: HONDA MOTOR CO., LTD., Tokyo (JP)

(72) Inventor: Tensho Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 16/148,586

(22) Filed: Oct. 1, 2018

(65) Prior Publication Data

US 2019/0120197 A1    Apr. 25, 2019

(30) Foreign Application Priority Data

Oct. 19, 2017    (JP) .................................. 2017-202483

(51) Int. Cl.
*F02P 5/06* (2006.01)
*F02P 5/14* (2006.01)
(Continued)

(52) U.S. Cl.
CPC ................. *F02P 5/06* (2013.01); *F02P 5/14* (2013.01); *F02P 5/1506* (2013.01); *F02N 11/00* (2013.01)

(58) Field of Classification Search
CPC .... F02P 5/06; F02P 5/1506; F02P 5/14; F02P 5/1502; F02P 5/04; F02N 11/00
(Continued)

(56) References Cited

U.S. PATENT DOCUMENTS

| 4,799,469 A * | 1/1989 | Nagano ................. F02P 5/1504 477/111 |
| 2015/0247482 A1 * | 9/2015 | Enomoto ............ F02N 11/0844 701/113 |

(Continued)

FOREIGN PATENT DOCUMENTS

| CN | 101103196 A | 1/2008 |
| CN | 103998768 A | 8/2014 |

(Continued)

OTHER PUBLICATIONS

Office Action dated May 14, 2019, issued in counterpart JP Application No. 2017-202483, with English machine translation. (6 pages).

(Continued)

*Primary Examiner* — Joseph J Dallo
*Assistant Examiner* — Scott A Reinbold
(74) *Attorney, Agent, or Firm* — Westerman, Hattori, Daniels & Adrian, LLP

(57) ABSTRACT

In starting of an internal combustion engine, among a plurality of combustions of the internal combustion engine when it is assumed that an ignition timing is set to a predetermined reference ignition timing, a preceding ignition timing, which is the ignition timing for a preceding combustion through which a peak of a rotation speed of the internal combustion engine is likely to enter a predetermined resonance rotation speed range where resonance of the conveyance dependent on vibration of the internal combustion engine is induced, is set further on a delay angle side than the reference ignition timing, and a later ignition timing, which is the ignition timing for a later combustion after the preceding combustion, is set further on an advance angle side than the set preceding ignition timing so that the (Continued)

peak of the rotation speed of the internal combustion engine exceeds the resonance rotation speed range.

7 Claims, 6 Drawing Sheets

(51) Int. Cl.
    *F02P 5/15*     (2006.01)
    *F02N 11/00*     (2006.01)

(58) Field of Classification Search
    USPC .................................................. 123/406.25
    See application file for complete search history.

(56) References Cited

U.S. PATENT DOCUMENTS

| | | | | |
|---|---|---|---|---|
| 2016/0200316 | A1* | 7/2016 | Orita | B60K 6/48 |
| | | | | 701/22 |
| 2018/0112612 | A1* | 4/2018 | Tsunoda | F02D 41/0002 |
| 2018/0216555 | A1* | 8/2018 | Hayashima | F02N 11/0848 |
| | | | | 11/848 |
| 2018/0283299 | A1* | 10/2018 | Kondo | F02D 35/023 |

FOREIGN PATENT DOCUMENTS

| | | |
|---|---|---|
| CN | 104879225 A | 9/2015 |
| JP | 2009-235938 A | 10/2009 |
| JP | 2015-113774 A | 6/2015 |
| JP | 2018-155224 A | 10/2018 |

OTHER PUBLICATIONS

Office Action dated Aug. 6, 2019, issued in counterpart JP application No. 2017-202483, with English translation. (4 pages).

Office Action dated Aug. 21, 2020, issued in counterpart CN Application No. 201811194404.3, with English translation (9 pages).

* cited by examiner

IGNITION TIMING CONTROLLER OF INTERNAL COMBUSTION ENGINE

CROSS REFERENCES TO RELATED APPLICATIONS

The present application claims priority under 35 U.S.C. § 119 to Japanese Patent Application No. 2017-202483, filed Oct. 19, 2017, entitled "Ignition Timing Controller of Internal Combustion Engine." The contents of this application are incorporated herein by reference in their entirety.

TECHNICAL FIELD

The present disclosure relates to ignition timing controllers of internal combustion engines for controlling ignition timings of internal combustion engines mounted on conveyances.

BACKGROUND

As a related art ignition timing controller for an internal combustion engine of this kind, what is disclosed in Japanese Unexamined Patent Application Publication No. 2015-113774 is known for example. In such an ignition timing controller, when, in cold starting of the internal combustion engine as a power source of a vehicle, an ignition timing is set to a timing on a predetermined delay angle side so as to activate a catalyst for cleaning up an exhaust gas of the internal combustion engine, the vehicle can cause resonance dependent on vibrations of the internal combustion engine. Thus, to inhibit such resonance, the ignition timings of the internal combustion engine are set as below.

That is, when an ignition timing is set to a timing on the predetermined delay angle side, it may be found in advance that which combustion is the combustion after the starting of the internal combustion engine in which the peak of the rotation speed of the internal combustion engine enters a resonance rotation speed range that can be grasped in advance, which is a range of the rotation speed of the internal combustion engine where a vehicle causes resonance. In the related art ignition timing controller, as a result of focusing attention on this point, for example, the ignition timings for the first and second combustions after causing the starting of the internal combustion engine are set further on an advance angle side than the above-described timing on the delay angle side. Thus, inhibition of the resonance of a vehicle is attempted by shortening time that it takes for the rotation speed of the internal combustion engine to pass through the resonance rotation speed range in the starting of the internal combustion engine.

As described above, in the related art ignition timing controller, ignition timings are consistently set on the advance angle side merely to inhibit the resonance of a vehicle in the starting of the internal combustion engine. Thus, for example in the starting of the internal combustion engine, the rotation speed of the internal combustion engine can fail to rise sufficiently through the first combustion and can allow its peak to enter the resonance rotation speed range, and accordingly the time during which the rotation speed of the internal combustion engine remains in the resonance rotation speed range becomes long overall and as a result, the resonance of the vehicle can fail to be suitably inhibited. In particular, since the vibrations of the internal combustion engine caused by the first combustion tend to be relatively large, the above-described malfunction becomes more noticeable. Besides, since the setting of ignition timings on the advance angle side is performed continuously from the ignition timing for the first combustion, for example immediately after the complete explosion in the internal combustion engine, the rotation speed of the internal combustion engine can race excessively largely through the second combustion and the combustions thereafter.

SUMMARY

The present disclosure has been made so as to address the above-described problems and describes an ignition timing controller of an internal combustion engine that can shorten the time during which, in the starting of the internal combustion engine, the rotation speed of the internal combustion engine remains in a resonance rotation speed range and thus can inhibit racing of the rotation speed of the internal combustion engine immediately after the complete explosion in the internal combustion engine while suitably inhibiting the resonance of a conveyance caused with the internal combustion engine.

Thus, according to a first aspect of an embodiment, an ignition timing controller 1 of an internal combustion engine 3 for controlling an ignition timing of the internal combustion engine 3 mounted on a conveyance (vehicle V in the embodiment)(hereinafter, similarly in the present aspect) includes an ignition timing setting unit (ECU 2, steps 6, 7, 8A, 8B, 8D, and 8E in FIG. 2, and FIGS. 4A and 4B) that, in starting of the internal combustion engine 3, sets a preceding ignition timing further on a delay angle side than a predetermined reference ignition timing IGMBT and sets a later ignition timing further on an advance angle side than the set preceding ignition timing so that a peak of a rotation speed (engine speed NE) of the internal combustion engine 3 exceeds a predetermined resonance rotation speed range ZNR where resonance of the conveyance dependent on vibration of the internal combustion engine 3 is induced, the preceding ignition timing being the ignition timing IGLOG for a preceding combustion through which the peak of the rotation speed of the internal combustion engine is likely to enter the resonance rotation speed range ZNR, the later ignition timing being the ignition timing IGLOG for a later combustion after the preceding combustion, the preceding combustion and the later combustion being included in a plurality of combustions of the internal combustion engine 3 when it is assumed that the ignition timing IGLOG is set to the reference ignition timing IGMBT.

In this structure, in the starting of the internal combustion engine, among a plurality of combustions of the internal combustion engine in a case where it is assumed that an ignition timing is set to a predetermined reference ignition timing, a preceding ignition timing, which is an ignition timing for a preceding combustion through which the peak of the rotation speed of the internal combustion engine is likely to enter a predetermined resonance rotation speed range where the resonance of the conveyance dependent on vibrations of the internal combustion engine is induced (hereinafter referred to as a "preceding combustion") is set further on the delay angle side than the reference ignition timing. Further, in the starting of the internal combustion engine, a later ignition timing, which is an ignition timing for a combustion after the preceding combustion, is set further on the advance angle side than the set preceding ignition timing so that the peak of the rotation speed of the internal combustion engine exceeds the resonance rotation speed range. Accordingly, in the starting of the internal combustion engine, the peak of the rotation speed of the internal combustion engine resulting from the preceding combustion can be suppressed so as to be lower than the resonance rotation speed range and by causing the rotation speed of the internal combustion engine to rise further and promptly pass through resonance rotation speed range through a combustion after the preceding combustion, the time during which the rotation speed of the internal combustion engine remains in the resonance rotation speed range can be shortened and the resonance of the conveyance can be suitably inhibited.

Unlike the related art ignition timing controller described above, where ignition timings are set on the advance angle side continuously from the ignition timing for the first combustion in the starting of the internal combustion engine, a later ignition timing is set on the advance angle side after making a preceding combustion sluggish by setting the preceding ignition timing on the delay angle side and accordingly, racing of the rotation speed of the internal combustion engine immediately after the complete explosion in the internal combustion engine can be inhibited.

According to a second aspect of the embodiment, in the ignition timing controller 1 of the internal combustion engine of the first aspect, a temperature parameter acquisition unit (water temperature sensor 12) that acquires a temperature parameter (engine water temperature TW) indicating a temperature of the internal combustion engine 3 may further be included, the reference ignition timing IGMBT being set to an optimum ignition timing that brings a maximum output torque of the internal combustion engine 3, the ignition timing setting unit setting the preceding ignition timing further on the delay angle side in relation to the reference ignition timing IGMBT as the temperature of the internal combustion engine 3 indicated as the acquired temperature parameter is higher (steps 6 and 7 in FIG. 2 and FIG. 3).

In this structure, the reference ignition timing is set to the optimum ignition timing that brings the maximum output torque of the internal combustion engine. In addition, as the temperature of the internal combustion engine indicated as the acquired temperature parameter is higher, the preceding ignition timing is set further on the delay angle side. Thus, in the starting of the internal combustion engine, as the friction of the internal combustion engine decreases with rise in the temperature of the internal combustion engine, the above-described preceding combustion can be made more sluggish and accordingly, depending on the temperature of the internal combustion engine, racing of the rotation speed of the internal combustion engine immediately after the complete explosion in the internal combustion engine can be suitably inhibited. In addition, since in starting the internal combustion engine, the degree of the delay angle of a preceding ignition timing can be decreased as the temperature of the internal combustion engine is lower and the preceding ignition timing can be made closer to the reference ignition timing set as described above, deterioration of the preceding combustion through the setting of the preceding ignition timing on the delay angle side can be inhibited.

According to a third aspect of the embodiment, in the ignition timing controller 1 of the internal combustion engine 3 of the second aspect, the ignition timing setting unit may gradually set the preceding ignition timing further on the delay angle side as the temperature of the internal combustion engine 3 indicated as the temperature parameter is higher (steps 6 and 7 in FIG. 2 and FIG. 3).

In this structure, as the temperature of the internal combustion engine indicated as the temperature parameter is higher, the preceding ignition timing is gradually set further on the delay angle side. Thus, the preceding ignition timing can be set on the delay angle side minutely, depending on the temperature of the internal combustion engine, and as a result, when the stopping and starting of the internal combustion engine are repeated and the temperature of the internal combustion engine is slightly changed, no need to largely change the preceding ignition timing accordingly occurs and feeling at the starting of the internal combustion engine can be enhanced. In addition, the above-described advantages according to the second aspect, that is, suitable inhibition of racing of the rotation speed of the internal combustion engine immediately after the complete explosion in the internal combustion engine and inhibition of deterioration of the preceding combustion can be obtained concurrently.

According to a fourth aspect of the embodiment, in the ignition timing controller 1 of the internal combustion engine 3 of any one of the first to third aspects, the ignition timing setting unit may set the preceding ignition timing through the setting of the preceding ignition timing so that the peak of the rotation speed of the internal combustion engine 3 falls below the resonance rotation speed range ZNR and set the later ignition timing through the setting of the later ignition timing so that when the rotation speed of the internal combustion engine 3 drops from the peak, the rotation speed exceeds the resonance rotation speed range ZNR (FIG. 4).

In this structure, by the ignition timing setting unit described in the explanation of the first aspect, the preceding ignition timing is set so that the peak of the rotation speed of the internal combustion engine falls below the resonance rotation speed range, and the later ignition timing is set so that the engine speed of the internal combustion engine exceeds the resonance rotation speed range when the engine speed drops from the peak. Thus, by causing the rotation speed of the internal combustion engine to promptly pass through the resonance rotation speed range as described above and additionally inhibiting drop into the resonance rotation speed range after that, the time during which the rotation speed of the internal combustion engine remains in the resonance rotation speed range can be further shortened and the above-described advantage, that is, the advantage that the resonance of the conveyance can be suitably inhibited is obtainable effectively.

Thus, according to a fifth aspect, an ignition timing controller 1 of an internal combustion engine 3 for controlling an ignition timing of the internal combustion engine 3 mounted on a conveyance (vehicle V in the embodiment) (hereinafter, similarly in the present aspect) includes an ignition timing setting unit (ECU 2, steps 6, 7, 8A, 8B, 8D, and 8E in FIG. 2) that, in starting the internal combustion engine 3, sets the ignition timing IGLOG for a first combustion further on a delay angle side than a predetermined reference ignition timing IGMBT and sets the ignition timing IGLOG for a second combustion further on an advance angle side than the set ignition timing IGLOG for the first combustion.

In this structure, in the starting of the internal combustion engine, the ignition timing for the first combustion is set further on the delay angle side than the predetermined reference ignition timing and the ignition timing for the second combustion is set further on the advance angle side than the set ignition timing for the first combustion. Thus, similar to the first aspect, in the starting of the internal combustion engine, the peak of the rotation speed of the internal combustion engine resulting from the first combustion can be suppressed so as to be lower than the resonance rotation speed range and by causing the rotation speed of the internal combustion engine to rise further and promptly pass through the resonance rotation speed range through the second combustion, the time during which the rotation speed of the internal combustion engine remains in the resonance rotation speed range can be shortened and the resonance of the conveyance can be suitably inhibited. Further, in the starting of the internal combustion engine, instead of continuously setting ignition timings from the ignition timing for the first combustion on the advance angle side, the setting of an ignition timing on the advance angle side is performed after making the combustion of the internal combustion engine sluggish by setting the ignition timing for the first combustion on the delay angle side and accordingly, racing of the engine speed of the internal combustion engine immediately after the complete explosion in the internal combustion engine can be inhibited. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

Figure 1:
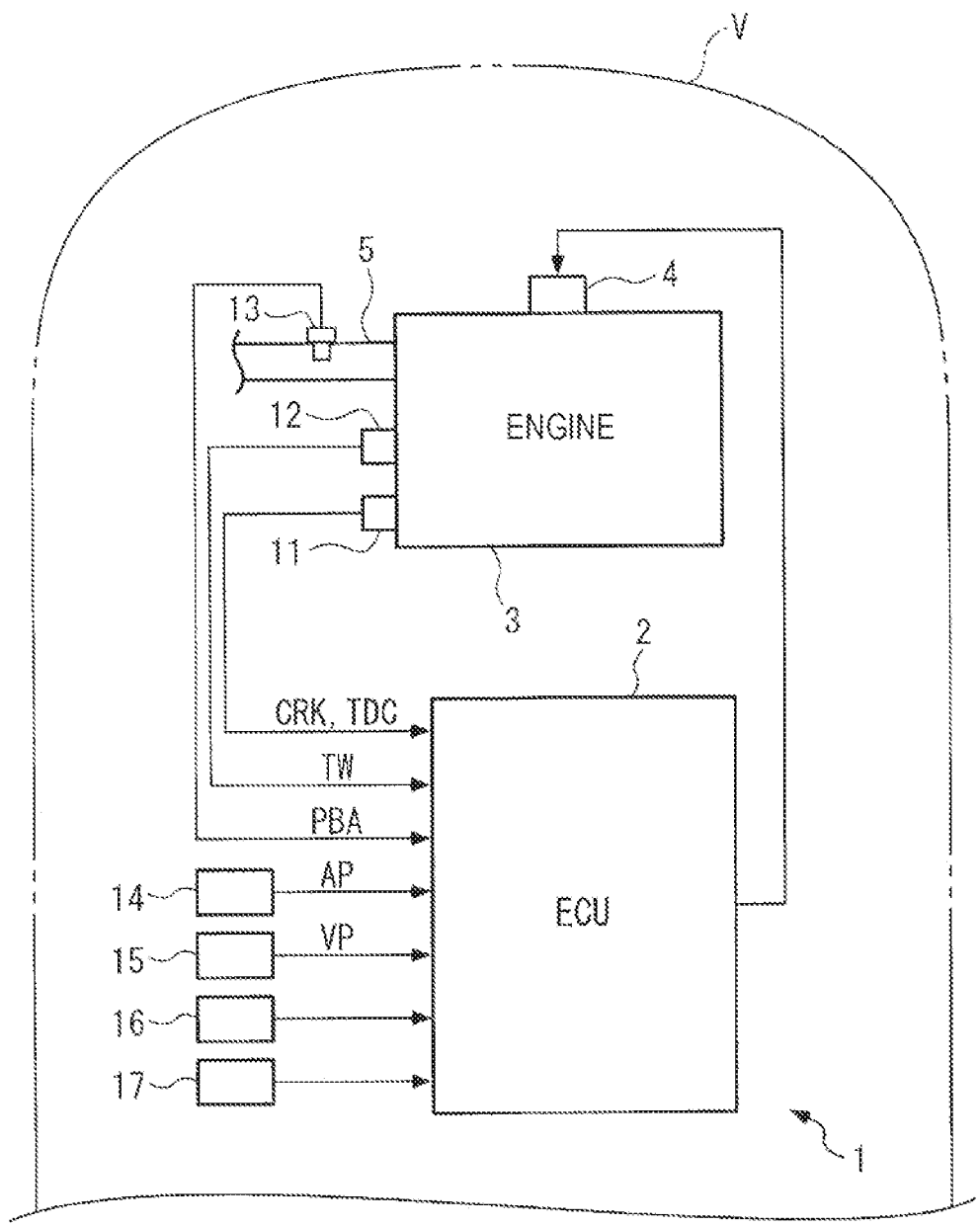
FIG. 1 schematically illustrates an ignition timing controller according to an embodiment of the present disclosure along with an internal combustion engine to which the ignition timing controller is applied and a vehicle on which the internal combustion engine is mounted.

Preferred embodiments of the present disclosure are described in detail below by referring to the drawings. FIG. 1 schematically illustrates an internal combustion engine (hereinafter referred to as an "engine") 3 to which an ignition timing controller 1 according to an embodiment of the present disclosure is applied. The ignition timing controller 1 includes an ECU 2, which is described below, and various sensors. The engine 3 is for example, a known gasoline engine with four pairs of cylinders and pistons (neither of which is illustrated) and is mounted on a vehicle V as a power source. In the engine 3, for each cylinder, a combustion chamber (not illustrated) is defined and an ignition plug 4 for igniting a fuel-air mixture in the combustion chamber is provided (and only one ignition plug 4 is illustrated). The ignition plug 4 is connected to the ECU 2 via an igniter (not illustrated) and an ignition timing thereof is controlled by a driving signal being input from the ECU 2 to the ignition plug 4.

An air intake passage 5 for guiding sucked air into the cylinder is connected to a cylinder head (not illustrated) of the engine 3 and the air intake passage 5 is provided, in the order from the upstream side, with a throttle valve (not illustrated) for controlling the quantity of suction air sucked into the cylinder and a fuel injection valve (not illustrated). A starter (not illustrated) for starting the engine 3 is coupled to a crank shaft (not illustrated) of the engine 3. The degree of the opening of the throttle valve, the injection operation of the fuel injection valve, and the operation of the starter are controlled by the ECU 2. In the starting of the engine 3, the degree of the opening of the throttle valve and the fuel injection quantity and a fuel injection timing of the fuel injection valve are respectively controlled with a predetermined degree of the opening, with a predetermined injection quantity, and at a predetermined injection timing, which are for the starting. The starting of the engine 3 in this case includes active starting by a driver and restarting after an automatic stop, which are described below.

The crank shaft of the engine 3 is provided with a crank angle sensor 11 and a cylinder block (not illustrated) of the engine 3 is provided with a water temperature sensor 12. The crank angle sensor 11 is made up of a magnet rotor and an MRE pickup and, with the rotation of the crank shaft, inputs a CRK signal and a TDC signal that are both pulse signals to the ECU 2. The CRK signal is input for every predetermined crank angle (for 10° each for example) and according to the CRK signal, the ECU 2 calculates the number of revolutions (hereinafter referred to as an "engine speed") NE of the engine 3. The TDC signal indicates that in any one of the cylinders, the piston (not illustrated) is present in a predetermined crank angle position that is slightly lower than the top dead center at the time of starting an air intake procedure.

The above-described water temperature sensor (temperature parameter acquisition unit) 12 is configured with a thermistor for example, and detects the temperature of cooling water that cools the engine 3 (hereinafter referred to as an "engine water temperature"), TW, to input the detection signal to the ECU 2. Further on the downstream side than the above-described throttle valve of the air intake passage 5, an air intake pressure sensor 13 is provided. The air intake pressure sensor 13 is configured with a semiconductor pressure sensor for example, and detects an air intake pressure PBA, which is an absolute pressure in the air intake passage 5, to input the detection signal to the ECU 2. In addition, an accelerator position sensor 14, a vehicle speed sensor 15, an ignition switch 16, and a brake switch 17 are connected to the ECU 2.

The above-described accelerator position sensor 14 detects the operation amount of the accelerator pedal of the vehicle V (hereinafter referred to as an "accelerator position"), AP, and the vehicle speed sensor 15 detects the speed of the vehicle V (hereinafter referred to as a "vehicle speed"), VP, and the detection signals are input to the ECU 2. The ignition switch 16 inputs an ON signal to the ECU 2 when the power switch (not illustrated) of the vehicle V is turned on by the driver, and inputs an OFF signal to the ECU 2 when the power switch is turned off. The brake switch 17 inputs an ON signal to the ECU 2 when the brake pedal (not illustrated) of the vehicle V is held down by the driver, and inputs an OFF signal to the ECU 2 when the brake pedal is not held down.

The ECU 2 (ignition timing setting unit) is configured with a microcomputer made up of an I/O interface, a CPU, RAM, ROM, and the like and performs various control processes in response to the detection signals from the above-described sensors 11 to 15 and the output signals from the switches 16 and 17 in accordance with control programs stored in the ROM.

The control processes include an idle stop control process for automatically stopping idling of the engine 3 (idle stop). In the idle stop control process, the engine 3 is automatically stopped by stopping the injection operation of the above-described fuel injection valve when predetermined idle stop conditions are satisfied. The idle stop conditions include predetermined conditions that the detected vehicle speed VP is lower than a predetermined vehicle speed that is higher than value 0 (5 km/h for example), that the accelerator position AP indicates value 0, that an ON signal from the brake switch 17 is input, and the like and when all of these conditions are satisfied, the engine 3 is automatically stopped. When the idle stop conditions are no longer satisfied in the automatic stop by for example, an output signal of the brake switch 17 being switched to an OFF signal, the ECU 2 controls the operations of the starter, the fuel injection valve, and the ignition plug 4, and the engine 3 is restarted accordingly.

Figure 2:
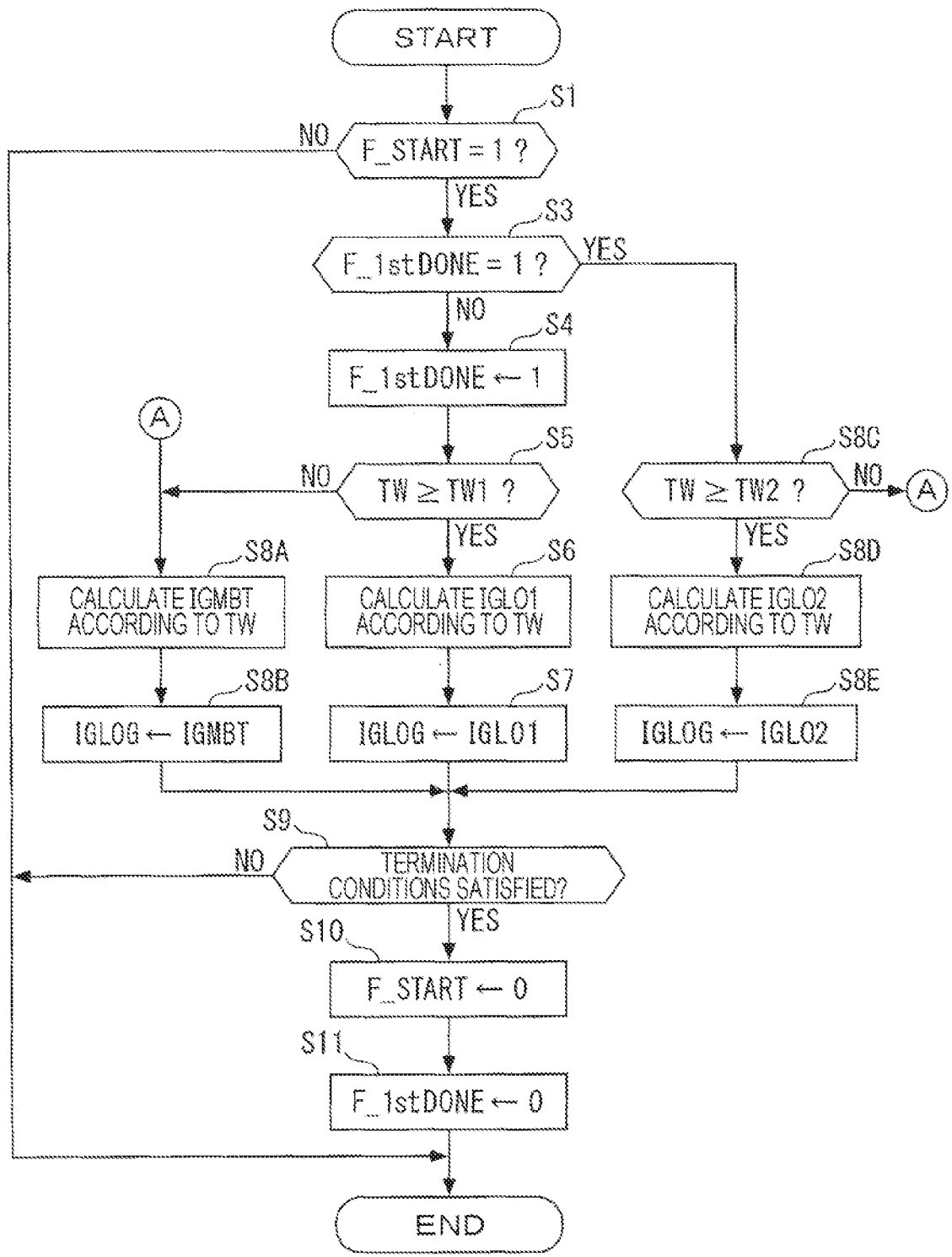
FIG. 2 is a flow chart that illustrates a process performed by an ECU of the ignition timing controller in FIG. 1.

Referring to FIG. 2, a process for controlling ignition timings in the starting of the engine 3, which is performed by the ECU 2, is described below. It was found by experiment that in the engine 3, when ignition timings IGLOG for the first and second combustions after causing the starting of the engine 3 were set to a reference ignition timing IGMBT, which is described below, depending on the conditions of the engine water temperature TW, the resonance of the vehicle V dependent on the vibrations of the engine 3 increased as the peak of the engine speed NE resulting from the first combustion entered a predetermined resonance rotation speed range ZNR (see FIGS. 4A to 6B), which is described below, and the engine speed NE exceeded a predetermined idle rotation speed NEIDL (see FIGS. 4 to 6) (1000 rpm for example) and largely raced immediately after the complete explosion in the engine 3. In the present process, to inhibit such malfunctions, ignition timings in the starting of the engine 3 is controlled as described below. The present process is performed repeatedly in synchronization with the occurrence of the TDC signal.

First, in step 1 in FIG. 2 (denoted as "SI" with the other steps denoted similarly), it is determined whether a starting controlling flag F_START indicates "1." The starting controlling flag F_START is set to "1" when below-described ignition timing control for starting the engine 3 in step 3 and the steps thereafter (hereinafter referred to as a "starting ignition timing control") is performed. The starting of the engine 3 in this case includes the starting accompanied by the turning-on operation of the power switch by the driver and the restarting from the automatic stop of the engine 3, which is described above, and the starting controlling flag F_START is set to "1" so as to perform the starting ignition timing control when the output signal of the ignition switch 16 is switched to an ON signal or when the idle stop conditions are no longer satisfied in the automatic stop of the engine 3, that is, when the starting of the engine 3 is caused.

When the result of step 1 described above is YES (F_START=1), that is, the starting ignition timing control is performed, it is determined whether an initial control completion flag F_1stDONE indicates "1" (step 3). The initial control completion flag F_1stDONE indicates that the control of the ignition timing for the first combustion by the present process is completed after the starting of the engine 3 is caused as "1," and is reset to "0" when the output signal of the ignition switch 16 is switched to an ON signal or when the idle stop conditions are no longer satisfied in the automatic stop of the engine 3, that is, when the starting of the engine 3 is caused.

When the result of step 3 described above is NO (F_1stDONE=0), that is, when the ignition timing control for the first starting by the present process is not yet completed after the starting of the engine 3 is caused, the initial control completion flag F_1stDONE is set to "1" (step 4) and it is determined whether the detected engine water temperature, TW, is higher than or equal to a first predetermined temperature TW1 (40° C. for example)(step 5).

Figure 3:
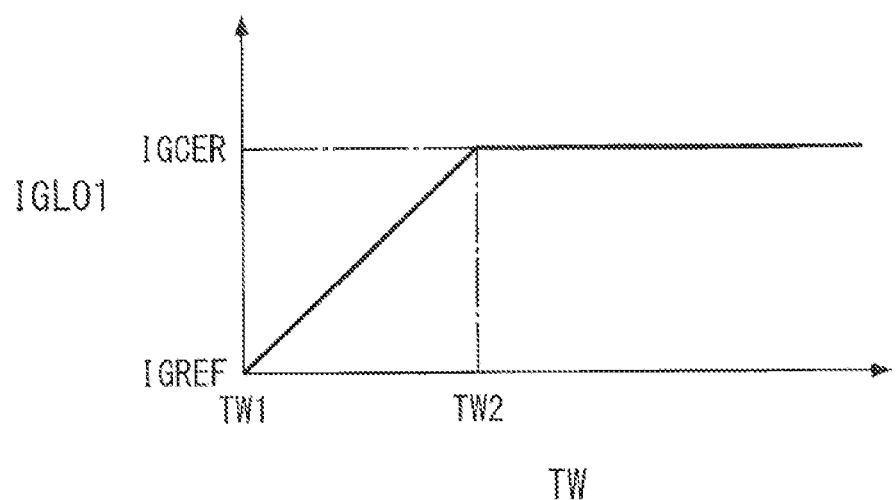
FIG. 3 illustrates an example of a map used in the process in FIG. 2.

When the result of step 5 described above is YES (TW≥TW1), a first ignition timing IGLO1 is calculated according to the engine water temperature TW by searching for a predetermined map, which is illustrated in FIG. 3 (step 6). In the map, the first ignition timing IGLO1 is set to a value that is further on the delay angle side than the reference ignition timing IGMBT described below in relation to the engine water temperature TW at the same level. Specifically, as illustrated in FIG. 3, the first ignition timing IGLO1 is set to a predetermined value IGREF when the engine water temperature TW is the above-described first predetermined temperature TW1, and in a range of temperatures higher than the first predetermined temperature TW1 and lower than a second predetermined temperature TW2 (70° C. for example) (TW1<TW<TW2), the first ignition timing IGLO1 is set so as to increase gradually as the engine water temperature TW is higher, that is, so as to gradually reach a value on the delay angle side, and in a range of temperatures higher than or equal to the second predetermined temperature TW2 (TW≥TW2), the first ignition timing IGLO1 is set to a predetermined constant value IGCER. The reasons are described below.

In step 7 that follows step 6 described above, the ignition timing IGLOG is set to the calculated first ignition timing IGLO1 and the process proceeds to step 9 described below.

In contrast, when the result of step 5 described above is NO and the engine water temperature TW is lower than the first predetermined temperature TW1, the reference ignition timing IGMBT for the starting of the engine 3 is calculated according to the engine water temperature TW by searching for a predetermined map (not illustrated)(step 8A). The reference ignition timing IGMBT is an optimum ignition timing that brings a maximum output torque of the engine 3 and the above-described map is the resultant of mapping performed according to the engine water temperature TW after determining the reference ignition timing IGMBT in advance by experiment or the like. After that, the ignition timing IGLOG is set to the calculated reference ignition timing IGMBT (step 8B) and the process proceeds to step 9 described below.

As described above, immediately after the starting of the engine 3 is caused and when the present process is performed for the first time, the ignition timing IGLOG is set to the first ignition timing IGLO1 when the engine water temperature TW is higher than or equal to the first predetermined temperature TW1, and set to the reference ignition timing IGMBT when TW<TW1. When the ignition timing IGLOG is set in step 7, step 8B, or step 8E described below, a driving signal based on the IGLOG is input to the ignition plug 4 and accordingly, an ignition timing of the ignition plug 4 is controlled so as to be IGLOG.

In contrast, after the initial control completion flag F_1stDONE is set to "1" by performing step 4 described above, the result of the step 3 is YES accordingly and in that case, it is determined whether the engine water temperature TW is higher than or equal to the second predetermined temperature TW2 (step 8C). When the result is NO (TW<TW2), step 8A described above and the steps thereafter are performed. When the result is YES and TW≥TW2, according to the engine water temperature TW, a second ignition timing IGLO2 is calculated by searching for a predetermined map (not illustrated)(step 8D). In the map, the second ignition timing IGLO2 is set so as to be a value that is further on the delay angle side as the engine water temperature TW is higher and is set, in relation to the engine water temperature TW at the same level, to a value that is further on the advance angle side than the first ignition timing IGLO1 and further on the delay angle side than the reference ignition timing IGMBT.

Subsequently, the ignition timing IGLOG is set to the calculated second ignition timing IGLO2 (step 8E) and the process proceeds to step 9.

Thus, when the present process is performed for the second time and more, the ignition timing IGLOG is set to the reference ignition timing IGMBT when TW<TW2 (steps 8A and 8B) and set to the second ignition timing IGLO2 when TW≥TW2 (steps 8D and 8E). Accordingly, in the starting of the engine 3, the ignition timings IGLOG for the second combustion and the combustions thereafter are set so as to be further on the advance angle side than the ignition timing IGLOG for the first combustion set to the first ignition timing IGLO1 when TW≥TW1.

In step 9 that follows step 7, 8B, or 8E, it is determined whether predetermined termination conditions of the starting ignition timing control are satisfied. The termination conditions are determined as being satisfied when the engine speed NE reaches a predetermined rotation speed (500 rpm for example) that is lower than the idle rotation speed NEIDL and it is determined that the engine 3 had a complete explosion. When the result of step 9 is NO and the termination conditions are not satisfied, the present process of this time ends without any further change.

In contrast, when the result of step 9 described above is YES and the termination conditions are satisfied, the starting controlling flag F_START is reset to "0" so as to end the starting ignition timing control (step 10) and the initial control completion flag F_1stDONE is reset to "0" (step 11), and the present process of this time ends. After the starting controlling flag F_START is reset to "0" by performing step 10, the result of step 1 described above is NO and in that case, step 3 described above and the steps thereafter are skipped and the present process ends.

Figure 4A:
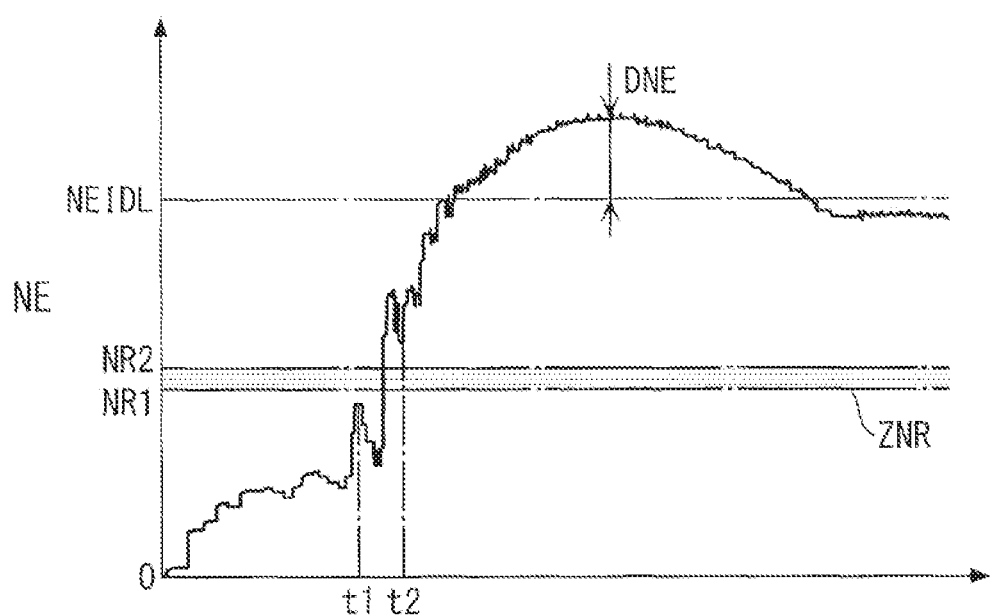
FIGS. 4A and 4B are timing charts that illustrate the progression of the rotation speed of the internal combustion engine and the longitudinal acceleration of the vehicle, respectively, in a case where the process in FIG. 2 is performed in the starting of the internal combustion engine.
Figure 4B:
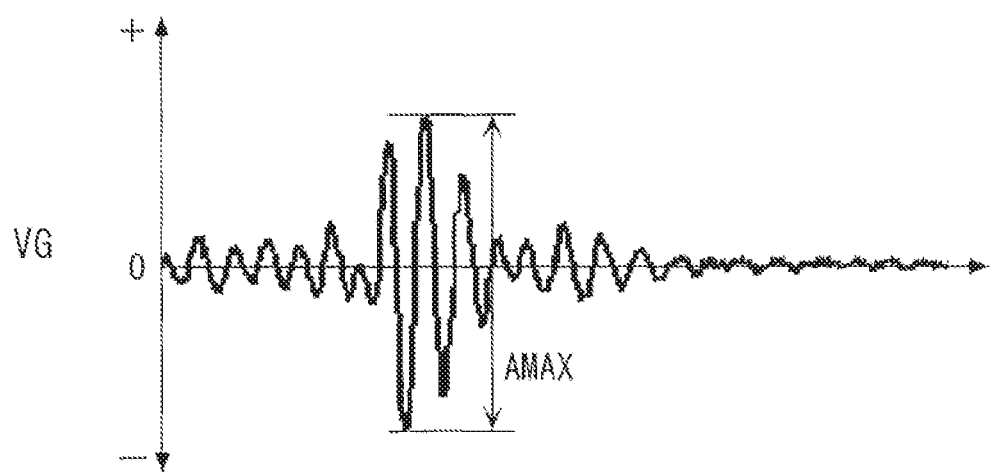

FIGS. 4A and 4B illustrate respective examples of the progressions of the engine speed NE and a longitudinal acceleration VG of the vehicle V in a case where in the starting of the engine 3, the ignition timing IGLOG is set through the process illustrated in FIG. 2, and more specifically, illustrate respective progressions of the engine speed NE and the longitudinal acceleration VG in a case where the engine water temperature TW is higher than or equal to the first predetermined temperature TW1. The horizontal axes in FIGS. 4A and 4B each indicate time. The above-mentioned longitudinal acceleration VG of the vehicle V is an acceleration (vibration acceleration) in a longitudinal direction, which is caused by the resonance of the vehicle V dependent on the vibrations of the engine 3 and in FIG. 4B, the forward acceleration is denoted as (+) and the rearward acceleration is denoted as (−). In FIG. 4A, NR1 and NR2 represent predetermined first and second resonance rotation speeds, respectively, which define the resonance rotation speed range ZNR (NR2>NR1), and the resonance rotation speed range ZNR is a range of the engine speed NE where the resonance of the vehicle V dependent on the vibrations of the engine 3 is induced.

As described with reference to FIG. 2, when the ignition timing IGLOG for the first combustion after the starting of the engine 3 is caused is set (NO in step 3) and when the engine water temperature TW is higher than or equal to the first predetermined temperature TW1 (YES in step 5), the ignition timing IGLOG is set to the first ignition timing IGLO1 (step 7) and accordingly set further on the delay angle side than the reference ignition timing IGMBT. Thus, in the starting of the engine 3, the first combustion becomes sluggish and rise in the engine speed NE is suppressed, and accordingly as illustrated in FIG. 4A, the peak of the engine speed NE resulting from the first combustion falls below the resonance rotation speed range ZNR (timing t1).

The ignition timing IGLOG for the second combustion and the combustions thereafter after the starting of the engine 3 is caused is set to the reference ignition timing IGMBT when TW<TW2 (YES in step 3, NO in step SC, and steps 8A and 8B) and set to the second ignition timing IGLO2 when TW≥TW2 (YES in step 3, YES in step 8C, and steps 8D and 8E) and accordingly, in either case, the ignition timing IGLOG is set further on the advance angle side than the ignition timing IGLOG for the above-described first combustion. Through the second combustion that uses the ignition timing IGLOG set as described above, the engine speed NE further rises and promptly passes through and exceeds the resonance rotation speed range ZNR and when the peak falls (timing t2), is past the resonance rotation speed range ZNR. When the engine speed NE reaches the predetermined rotation speed as the third combustion and the combustions and thereafter are performed, it is determined that the termination conditions are satisfied (YES in step 9) and the starting ignition timing control ends (step 10 and NO in step 1).

The setting of the first ignition timing IGLO1 in the map illustrated in FIG. 3 mentioned above is described below. The first ignition timing IGLOT is set in advance by experiment or the like so that in the starting of the engine 3, the engine speed NE exhibits progression as described with reference to FIGS. 4A and 4B. In this case, as described with reference to FIG. 2 and FIG. 3, the first ignition timing IGLO1 is set according to the engine water temperature TW and set so as to be a value that is further on the delay angle side as the engine water temperature TW is higher when the engine water temperature TW is higher than or equal to the first predetermined temperature TW1 and lower than the second predetermined temperature TW2. Thus, the ignition timing IGLOG for the first combustion is set further on the delay angle side as the engine water temperature TW is higher. The reason is that since the friction of the engine 3 decreases as the engine water temperature TW is higher, the engine speed NE can easily exceed the idle rotation speed NEIDL and largely race and it is thus desired to make the first combustion more sluggish to suitably suppress such racing.

In addition, when TW1<TW<TW2, the first ignition timing IGLO1 is set so as to be a value on the delay angle side more gradually as the engine water temperature TW is higher because when the stopping and starting of the engine 3 are repeated and the engine water temperature TW is slightly changed, it is desired to prevent the ignition timing IGLOG for the first combustion from being largely changed accordingly. When the engine water temperature TW is higher than or equal to the second predetermined temperature TW2, the first ignition timing IGLO1 is set to the constant value IGCER, which is further on the delay angle side. The reason in this case is that the engine speed NE can cause racing more easily because the engine water temperature TW is relatively high, and it is thus desired to securely inhibit such racing.

Further, when the engine water temperature TW is lower than the first predetermined temperature TW1 (NO in step 5), the ignition timing IGLOG for the first combustion is set to the reference ignition timing IGMBT (steps 8A and 8B). The reason in this case is that even when the ignition timing IGLOG for the first combustion is set to the reference ignition timing IGMBT, the engine speed NE falls below the resonance rotation speed range ZNR because the friction of the engine 3 is relatively large.

The above-described reasons for setting the ignition timing IGLOG for the first combustion to the reference ignition timing IGMBT when the engine water temperature TW is lower than the first predetermined temperature TW1 are similarly applicable regarding setting the ignition timing IGLOG for the second combustion and the combustions thereafter to the reference ignition timing IGMBT when the engine water temperature TW is lower than the second predetermined temperature TW2. The ignition timing IGLOG for the second combustion and the combustions thereafter is set to the second ignition timing IGLO2 that is further on the delay angle side than the reference ignition timing IGMBT when TW≥TW2 because in this case, the engine water temperature TW is relatively high and the engine speed NE can cause racing more easily, and it is thus desired to securely inhibit such racing.

According to the present embodiment, through the setting of the ignition timing IGLOG described above, as illustrated in FIG. 4B, in the starting of the engine 3, a maximum value AMAX of the amplitude of the longitudinal acceleration VG, which indicates the degree of the resonance of the vehicle V, is relatively small and as a result, the longitudinal acceleration VG converges on approximately value 0 in a relatively short time. Moreover, as illustrated in FIG. 4A, in the starting of the engine 3, a difference DNE between the engine speed NE that is highest and the idle rotation speed NEIDL is relatively small.

Figure 5A:
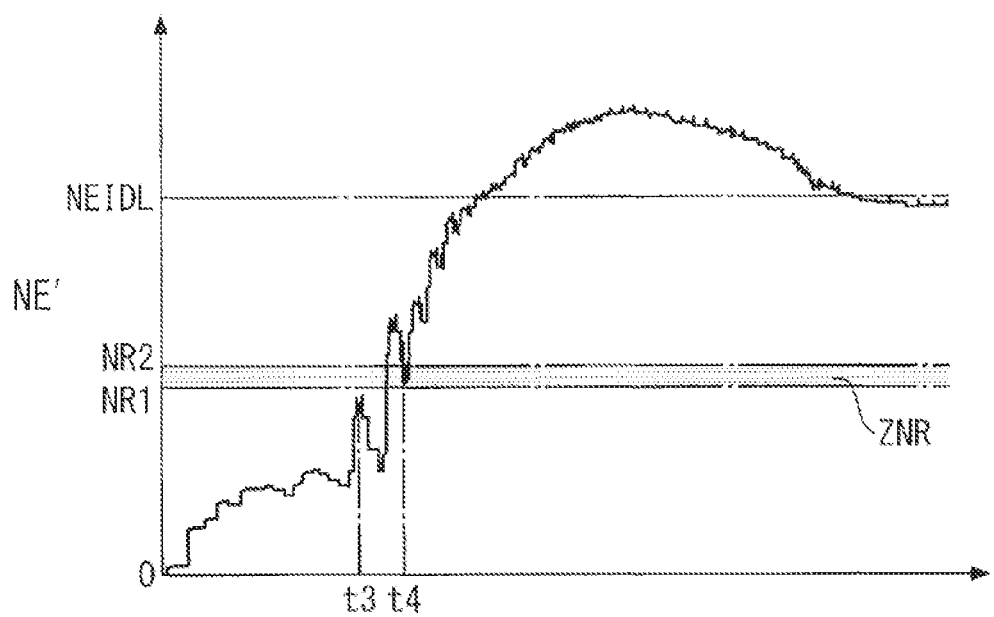
FIGS. 5A and 5B are timing charts that illustrate the progression of the rotation speed of an internal combustion engine according to a first comparative example and the longitudinal acceleration of a vehicle, respectively, immediately after the complete explosion after the starting of the internal combustion engine is caused.
Figure 5B:
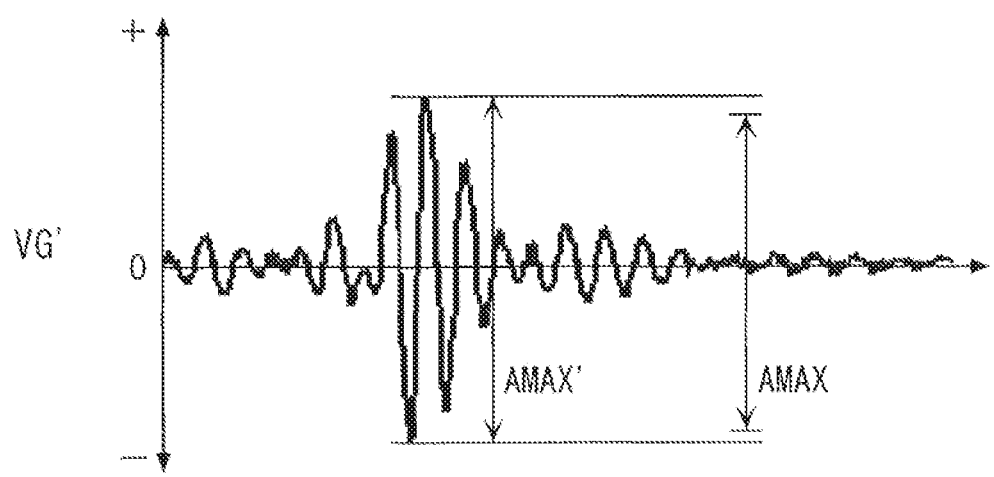

In contrast, FIGS. 5A and 5B illustrate respective progressions of an engine speed NE' and a longitudinal acceleration VG' of a vehicle V according to a first comparative example and the first comparative example is different in that, in comparison with the present embodiment, in the starting of the engine 3, the ignition timings for the first and second combustions after the starting of the engine 3 is caused are each set to a first ignition timing IGLO1 that is further on the delay angle side.

In the first comparative example, in the starting of the engine 3, by setting the ignition timings as described above, as illustrated in FIG. 5A, the peak of the engine speed NE' resulting from the first combustion falls below a resonance rotation speed range ZNR (timing t3) but when the peak of the engine speed NE' resulting from the second combustion drops (timing t4), the engine speed NE' enters the resonance rotation speed range ZNR and accordingly, the time during which the engine speed NE' remains in the resonance rotation speed range ZNR is longer than that in the present embodiment. Consequently, as illustrated in FIG. 5B, in the starting of the engine 3, a maximum value AMAX' of the amplitude of the longitudinal acceleration VG' of the vehicle V is larger than the maximum value AMAX in the present embodiment and as a result, it takes a relatively long time for the longitudinal acceleration VG' to converge on approximately value 0.

Figure 6A:
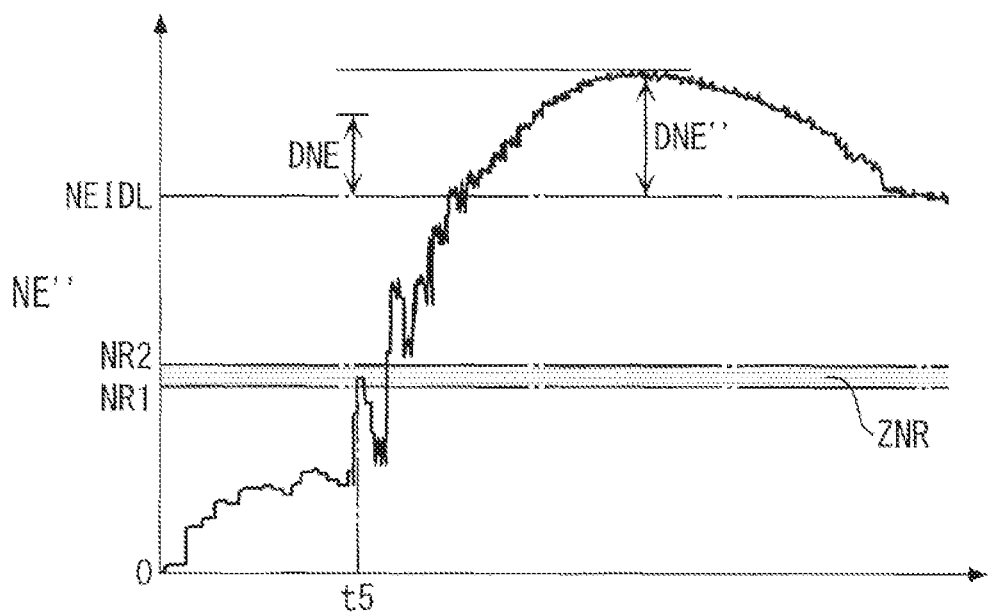
FIGS. 6A and 6B are timing charts that illustrate the progression of the rotation speed of an internal combustion engine according to a second comparative example and the longitudinal acceleration of a vehicle, respectively, immediately after the complete explosion after the starting of the internal combustion engine is caused.
Figure 6B:
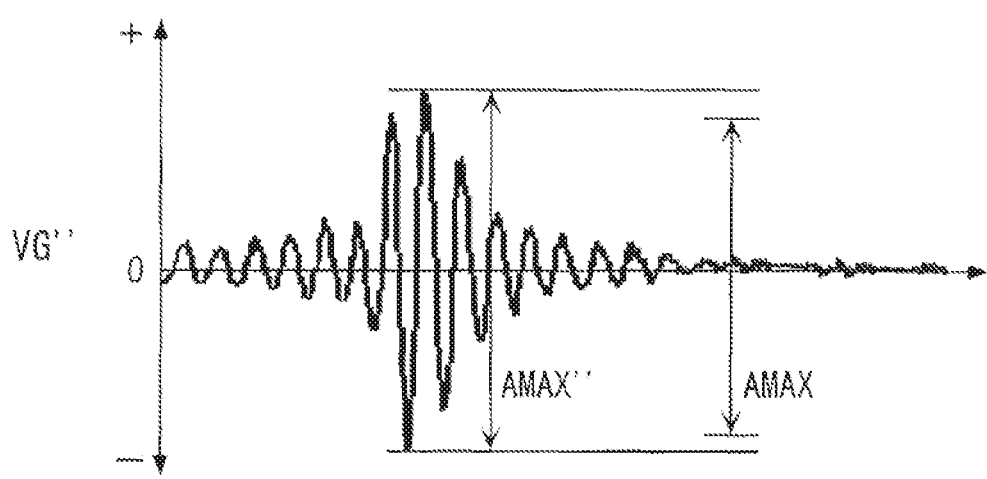

FIGS. 6A and 6B illustrate respective progressions of an engine speed NE" and a longitudinal acceleration VG" of a vehicle V according to a second comparative example and the second comparative example is different in that, in comparison with the present embodiment, in the starting of the engine 3, the ignition timings for the first and second combustions after the starting of the engine 3 is caused are both set to a reference ignition timing IGMBT.

In the second comparative example, in the starting of the engine 3, by setting the ignition timings as described above, as illustrated in FIG. 6A, the engine speed NE" promptly passes through a resonance rotation speed range ZNR through the second combustion but the peak of the engine speed NE" resulting from the first combustion enters the resonance rotation speed range ZNR (timing t5) and accordingly, the time during which the engine speed NE" remains in the resonance rotation speed range ZNR is longer than that in the present embodiment. Consequently, as illustrated in FIG. 6B, in the starting of the engine 3, a maximum value AMAX" of the amplitude of the longitudinal acceleration VG" of the vehicle V is larger than the maximum value AMAX in the present embodiment and as a result, it takes a relatively long time for the longitudinal acceleration VG" to converge on approximately value 0. Besides, since the ignition timings are set continuously to the reference ignition timing IGMBT from the ignition timing for the first combustion, the engine speed NE" exceeds an idle rotation speed NEIDL and causes excessively large racing, and a difference DNE" between the engine speed NE" that is highest and the idle rotation speed NEIDL is larger than the difference DNE in the present embodiment.

As described above, according to the present embodiment, in the starting of the engine 3, among a plurality of combustions of the engine 3 in a case where it is assumed that the ignition timing IGLOG is set to the reference ignition timing IGMBT, the ignition timing IGLOG for the first combustion (hereinafter referred to as a "preceding ignition timing") through which the peak of the engine speed NE is likely to enter the resonance rotation speed range ZNR is set further on the delay angle side than the reference ignition timing IGMBT (step 7 in FIG. 2), and the ignition timing IGLOG for the second combustion (hereinafter referred to as a "later ignition timing") is set further on the advance angle side than the set preceding ignition timing so that the peak of the engine speed NE exceeds the resonance rotation speed range ZNR (step 8B or 8E).

More specifically, as described with reference to FIG. 4, a preceding ignition timing is set so that the peak of the engine speed NE falls below the resonance rotation speed range ZNR, and a later ignition timing is set so that the peak of the engine speed NE exceeds the resonance rotation speed range ZNR and so that when the engine speed NE drops from the peak, the engine speed NE exceeds the resonance rotation speed range ZNR. Thus, by suppressing the peak of the engine speed NE resulting from the first combustion so that the peak is lower than the resonance rotation speed range ZNR and causing the engine speed NE to promptly pass through the resonance rotation speed range ZNR through the second combustion to prevent the engine speed NE from falling below the resonance rotation speed range ZNR after that, the time during which the engine speed NE remains in the resonance rotation speed range ZNR can be suitably shortened and the resonance of the vehicle V dependent on the vibrations of the engine 3 can be suitably inhibited. In particular, the vibrations of the engine 3 through the first combustion after the starting of the engine 3 is caused tend to be large and thus, the advantage that the resonance of the above-described vehicle V can be suitably inhibited is obtainable more effectively.

Further, in the starting of the engine 3, since a later ignition timing is set on the advance angle side after making the first combustion sluggish by setting a preceding ignition timing on the delay angle side as described above, racing of the engine speed NE immediately after the complete explosion in the engine 3 can be inhibited.

Moreover, the reference ignition timing IGMBT is set to the optimum ignition timing that brings the maximum output torque of the engine 3 and as the detected engine water temperature TW is higher, a preceding ignition timing is set further on the delay angle side than the reference ignition timing IGMBT (steps 6 and 7 and FIG. 3). Thus, since in the starting of the engine 3, the first combustion can be made more sluggish as the friction of the engine 3 is lowered by rise in the engine water temperature TW, depending on the engine water temperature TW, racing of the engine speed NE immediately after the complete explosion in the engine 3 can be suitably inhibited. In addition, since in the starting of the engine 3, the degree of the delay angle of a preceding ignition timing is decreased as the engine water temperature TW is lower, and the preceding ignition timing can accordingly be made closer to the reference ignition timing IGMBT set as described above, deterioration of the first combustion through the setting of a preceding ignition timing on the delay angle side can be inhibited.

Further, in this case, as the engine water temperature TW is higher, a preceding ignition timing is gradually set further on the delay angle side. Thus, a preceding ignition timing can be set on the delay angle side minutely, depending on the engine water temperature TW, and so, when the stopping and starting of the engine 3 are repeated and the engine water temperature TW is slightly changed, the preceding ignition timing can be prevented from being largely changed accordingly and feeling at the starting of the engine 3 can be enhanced. Since automatic stop and restart are performed in the engine 3 to which the ignition timing controller 1 is applied and thus the stopping and starting tend to be repeated relatively frequently, the present disclosure is useful in particular. In addition, the above-described advantages, that is, suitable inhibition of racing of the engine speed NE immediately after the complete explosion in the engine 3 and inhibition of deterioration of the first combustion can suitably be made mutually compatible.

The present disclosure can be implemented according to various aspects without being limited to the described embodiments. For example, in the embodiment, in the starting of the engine 3, among a plurality of combustions of the engine 3 in a case where it is assumed that the internal combustion engine IGLOG is set to the reference ignition timing IGMBT, the present disclosure is applied to the engine 3 where a preceding combustion through which the peak of the engine speed NE is likely to enter the resonance rotation speed range ZNR serves as the first combustion after the starting of the engine 3 is caused. The present disclosure, however, may be applied to an internal combustion engine where another suitable combustion, which is for example the second or third combustion after the starting of the internal combustion engine is caused, serves as the preceding combustion.

Although in the embodiment, the engine water temperature TW is used as the temperature parameter that indicates the temperature of the engine 3, another suitable parameter may be used, which is for example, the temperature of a lubricating oil of an internal combustion engine. Although in the embodiment, the preceding ignition timing in the present disclosure is set to the first ignition timing IGLO1 calculated according to the engine water temperature TW, similar to step 8A, the calculation (setting) may be performed by once calculating the reference ignition timing IGMBT and correcting the calculated IGMBT using a delay angle correction term CORET calculated according to the engine water temperature TW to the delay angle side. This is similarly applicable regarding the setting of a later ignition timing to the second ignition timing IGLO2. Not to mention, another suitable parameter may be used in setting the ignition timing IGLOG in addition to the engine water temperature TW.

In the embodiment, the ignition timing IGLOG for a preceding ignition timing, that is, the first combustion is set to the reference ignition timing IGMBT when the engine water temperature TW is lower than the first predetermined temperature TW1. In another engine, in a case where the peak of the rotation speed through the first combustion enters the resonance rotation speed range when the temperature of the cooling water is lower than the first predetermined temperature TW1 and the ignition timing for the first combustion is set to the reference ignition timing, the ignition timing for the first combustion may be set to the first ignition timing IGLO1 even when the temperature of the cooling water is lower than the first predetermined temperature TW1. That is, the determination of the engine water temperature TW in step 5 described above can be omitted, depending on the engine.

This is similarly applicable regarding the setting of the ignition timing IGLOG for the second combustion, that is, a later ignition timing. That is, in the embodiment, a later ignition timing is set to the reference ignition timing IGMBT when the engine water temperature TW is lower than the second predetermined temperature TW2. In another engine, when the temperature of the cooling water is lower than the second predetermined temperature TW2 and a later ignition timing is set to a reference ignition timing and when the engine speed largely races immediately after the complete explosion in the engine, the later ignition timing may be set to the second ignition timing IGLO2 even with the temperature of the cooling water that is lower than the second predetermined temperature TW2.

In contrast, in a case where the cooling water temperature of another engine is higher than or equal to the second predetermined temperature TW2, when a later ignition timing is set to the reference ignition timing IGMBT and no racing of the engine speed immediately after the complete explosion in the engine occurs, the ignition timing IGLOG for the second combustion and the combustions thereafter may be set to the reference ignition timing IGMBT even when the temperature of the cooling water is higher than or equal to the second predetermined temperature TW2. That is, the determination of the engine water temperature TW in step 8C described above can be omitted, depending on an engine. In any of the above-described cases, only when the above-described aims of the present disclosure can be achieved, a later ignition timing may be set to another suitable timing as a matter of course.

Although in the embodiment, the ignition timing IGLOG is set by map searching, the setting may be performed in another suitable manner, which is for example, through calculation that uses a model type. Although in the embodiment, the ignition timing controller 1 according to the present disclosure is applied to the engine 3 that is the power source of the vehicle V, the ignition timing controller 1 may be applied to an internal combustion engine that is no power source. In addition, the engine 3 may be a diesel engine although being a gasoline engine in the embodiment. Further, the conveyance according to the present disclosure may be a ship or the like although being the vehicle V in the present disclosure. Moreover, within the scope of the gist of the present disclosure, the structural details can be changed as appropriate. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An ignition timing controller of an internal combustion engine for controlling an ignition timing of the internal combustion engine mounted on a vehicle, the ignition timing controller comprising:
    an ignition timing setting controller that sets a plurality of ignition timings of a plurality of ignitions performed in starting of the internal combustion engine, the plurality of ignition timings includes a preceding ignition timing and a later ignition timing, the later ignition timing being an ignition timing coming later than the preceding ignition timing among the plurality of the ignition timings,
    wherein the ignition timing setting controller sets the preceding ignition timing further on a delay angle side than a predetermined reference ignition timing such that a peak of a first engine speed of the internal combustion engine resulting from the ignition of the preceding ignition timing becomes lower than a predetermined resonance rotation speed range where resonance of the vehicle dependent on vibration caused by rotation of the internal combustion engine is induced,
    wherein the ignition timing setting controller sets the later ignition timing further on an advance angle side than the preceding ignition timing such that a peak of a second engine speed of the internal combustion engine resulting from the ignition of the later ignition timing exceeds the predetermined resonance rotation speed range,
    wherein the ignition timing controller further comprises a temperature parameter acquisition unit that acquires a temperature parameter indicating a temperature of the internal combustion engine,
    the reference ignition timing being set to an optimum ignition timing that brings a maximum output torque of the internal combustion engine, and
    the ignition timing setting controller setting the preceding ignition timing further on the delay angle side with respect to the reference ignition timing as the temperature of the internal combustion engine indicated as the acquired temperature parameter is higher.

2. The ignition timing controller of the internal combustion engine according to claim 1, wherein
    the ignition timing setting controller gradually sets the preceding ignition timing further on the delay angle side as the temperature of the internal combustion engine indicated as the temperature parameter is higher.

3. The ignition timing controller of the internal combustion engine according to claim 1, wherein the ignition timing setting controller sets the later ignition timing such that when the second engine speed of the internal combustion engine drops from the peak, the second engine speed exceeds the resonance rotation speed range.

4. An ignition timing controller of an internal combustion engine for controlling an ignition timing of an ignition of the internal combustion engine mounted on a vehicle, the ignition timing controller comprising
    an ignition timing setting controller that, in starting the internal combustion engine, sets the ignition timing for a first combustion further on a delay angle side than a predetermined reference ignition timing and sets the ignition timing for a second combustion further on an advance angle side than the set ignition timing for the first combustion, the second combustion is subsequent to the first combustion; and
    a temperature parameter acquisition unit that acquires a temperature parameter indicating a temperature of the internal combustion engine,
    the reference ignition timing being set to an optimum ignition timing that brings a maximum output torque of the internal combustion engine, and
    the ignition timing setting controller setting the ignition timing for the first combustion further on the delay angle side with respect to the reference ignition timing as the temperature of the internal combustion engine indicated as the acquired temperature parameter is higher.

5. The ignition timing controller of the internal combustion engine according to claim 2, wherein
    the ignition timing setting controller decreases change rate of the preceding ignition timing changing to further the delay angle side as the temperature of the internal combustion engine indicated as the temperature parameter is higher.

6. The ignition timing controller of the internal combustion engine according to claim 1, wherein the starting of the internal combustion engine comprises restarting of the internal combustion engine from automatic stop of the internal combustion engine.

7. A method of controlling an ignition timing of an internal combustion engine mounted on a vehicle, the method comprising steps of:
    (i) setting by a controller a plurality of ignition timings of a plurality of ignitions performed in starting of the internal combustion engine, the plurality of ignition timings includes a preceding ignition timing and a later ignition timing, the later ignition timing being an ignition timing coming later than the preceding ignition timing among the plurality of the ignition timings,
    the step (i) further comprising
        (1) acquiring a temperature parameter indicating a temperature of the internal combustion engine by a temperature parameter acquisition unit,
        (2) setting the preceding ignition timing further on a delay angle side than a predetermined reference ignition timing such that a peak of a first engine speed of the internal combustion engine resulting from the ignition of the preceding ignition timing becomes lower than a predetermined resonance rotation speed range where resonance of the vehicle dependent on vibration caused by rotation of the internal combustion engine is induced, and
        (3) setting the later ignition timing further on an advance angle side than the preceding ignition timing such that a peak of a second engine speed of the internal combustion engine resulting from the ignition of the later ignition timing exceeds the predetermined resonance rotation speed range, the reference ignition timing being set to an optimum ignition timing that brings a maximum output torque of the internal combustion engine, the step (2) setting the preceding ignition timing further on the delay angle side with respect to the reference ignition timing as the temperature of the internal combustion engine indicated as the acquired temperature parameter is higher.

* * * * *